United States Patent [19]

Dusek

[11] 3,948,841
[45] Apr. 6, 1976

[54] PROCESS FOR PRODUCING TRANSPARENT GELS WITH IMPROVED MECHANICAL AND SORPTION PROPERTIES FROM COPOLYMERS OF 2-HYDROXYETHYL METHACRYLATE AND AMIDES OF ACRYLIC OR METHACRYLIC ACID

[76] Inventor: Karel Dusek, No. 33 Zeyerova alej, Prague, Czechoslovakia

[22] Filed: May 9, 1974

[21] Appl. No.: 468,415

Related U.S. Application Data

[63] Continuation-in-part of Ser. No. 362,498, May 21, 1973, abandoned.

[30] Foreign Application Priority Data

May 22, 1972 Czechoslovakia ................. 3474-72

[52] U.S. Cl. 260/29.6 TA; 260/29.6 H; 260/29.6 Z; 260/29.6 E; 260/29.6 SQ
[51] Int. Cl.² .................... C08F 2/10; C08F 20/56
[58] Field of Search... 260/29.6 TA, 29.6 H, 29.6 Z, 260/29.6 SQ, 29.6 E, 80.73, 86.1 N, 86.1 E, 80.75, 80.81

[56] References Cited
UNITED STATES PATENTS

| | | | |
|---|---|---|---|
| 3,699,089 | 10/1972 | Wichterle | 260/86.1 N |
| 3,721,657 | 3/1973 | Seiderman | 260/86.1 N |
| 3,758,448 | 9/1973 | Stamberger | 260/86.1 E |
| 3,780,003 | 12/1973 | Seymour et al. | 260/86.1 E |
| 3,784,540 | 1/1974 | Kliment et al. | 260/86.1 E |

*Primary Examiner*—Lucille M. Phynes

[57] ABSTRACT

A process for producing transparent hydrophilic gels having improved mechanical and sorption properties made from copolymers of 2-hydroxyethyl methacrylate and amides of methacrylic or acrylic acid, wherein said 2-hydroxyethyl methacrylate is copolymerized with about 20 to 90 weight percent of said methacrylamide or about 20 to 80 weight percent of said acrylamide in the presence of a crosslinking agent and a diluent, and the gels thus obtained are further modified by heating in an aqueous medium.

11 Claims, No Drawings

PROCESS FOR PRODUCING TRANSPARENT GELS WITH IMPROVED MECHANICAL AND SORPTION PROPERTIES FROM COPOLYMERS OF 2-HYDROXYETHYL METHACRYLATE AND AMIDES OF ACRYLIC OR METHACRYLIC ACID

This application is a continuation in part of my co-pending application Ser. No. 362,498, filed May 21, 1973 now abandoned.

BACKGROUND OF THE INVENTION

The present invention relates to a process for producing transparent gels having improved mechanical and sorption properties.

Hydrophilic gels derived from 2-hydroxyethyl methacrylate have been found to be useful in a number of medical applications, i.e., as a material for gel filtration, etc. An equilibrium sorption of these gels is, however, maximally only 40 to 45% water and the gels have a relatively low mechanical strengths. If the content of the water in the polymerization medium is increased above this limit, the degree of equilibrium swelling can be raised, however, the gels then become heterogeneous and possess poorer mechanical properties. In addition, gels based on 2-hydroxyethyl methacrylate have an inherent low selectivity. There has been mentioned the possibility to modify the gels by addition of a small amount of another monomer, as for example by the addition of up to 20% of methacrylamide (Czechoslovak Pat. Specifications Nos. 109,159 and 133,433) these additions, however, only slightly influence the properties of the basic gel. Combinations of 2-hydroxyethyl methacrylate and acrylamide have been described in (British Pat. Specification No. 829,565), however, these copolymers swell very heavily in water, are cohesionless and therefore do not have much practical importance.

It has now been found, that the addition of a greater amount of methacrylamide or the like changes essentially, and in some respects even unexpectedly, the properties of the gel. The degree of equilibrium swelling in water may be enhanced more than twice as much when using copolymers with methacrylamide, without, however, deteriorating the mechanical properties thereof. The copolymers with for instance, methacrylamide, have demonstrably better mechanical properties (modulus, strength, elongation at break) than the homopolymers at the same degree of swelling. At the same time, their selectivity to ions increases. It has unexpectedly been found that the introduction of the amide unit gives the gel a special property, which includes the unexpected substantial improvement of the mechanical properties by a heat treatment of the swollen copolymers of for instance, 2-hydroxyethyl methacrylate with methacrylamide or acrylamide, which properties cannot be achieved with the corresponding homopolymers.

SUMMARY OF THE INVENTION

It is accordingly an object of the instant invention to avoid one or more drawbacks of the prior art.

It is another object of the invention to provide a method for producing transparent gels and to provide for products produced therefrom.

Broadly speaking, the invention includes the provision of a process for producing transparent hydrophilic gels having improved mechanical and sorption properties made from copolymers of 2-hydroxyethyl methacrylate and amides of methacrylic or acrylic acid, comprising copolymerizing 2-hydroxyethyl methacrylate with about 20 to about 90 weight percent of methacrylamide and/or about 20 to about 80 weight percent of acrylamide in the presence up to about 10% of a crosslinking agent and up to about 80% of a diluent and subsequent heating.

In a preferred embodiment of the invention, there is provided a process for producing transparent gels with improved mechanical and sorption properties made from copolymers of 2-hydroxyethyl methacrylate and amides of acrylic or methacrylic acid, wherein the 2-hydroxyethyl methacrylate is copolymerized with about 20 to about 90 weight percent preferably about 25 – 75% of methacrylamide or about 20 to about 80 weight percent, preferably about 20 – 50% of acrylamide in the presence of a crosslinking agent and a diluent and the gels obtained in this manner are further modified, by heating in an aqueous medium.

The crosslinking agents operative in this invention may include those that are compatible and functional with the comonomers and which additionally are soluble in the monomer mixture. Included within the above are esters of polymerisable acids, such as acrylic and methacrylic acids, with glycols, such as $C_{1-4}$ alkylene glycols; comprising ethylene glycol, propylene glycol, butylene glycol, poly glycols, such as polyethylene glycol, polypropylene glycol; polyols, such as glycerine, monomethyl and monoethyl esters thereof; N,N'-methylene-bis-acrylamide, N,N'-methylene-bis-methacrylamide, tri-acryloyl-triazine, divinyl sulfone, and the like and compatible mixtures thereof. The crosslinking agent is generally included in amounts of 0 to about 10% by weight, suitably about 0.01 to 10%, preferably about 0.1 to about 5.0%.

The diluents are chosen broadly, according to the polarity of the monomer mixture, such that there is achieved in the final product, a homogeneous composition, attention being paid to the transparency of the gel in this regard.

The diluents may be any of the glycols and polyglycols above referred to and mixtures thereof with water. Monocarboxylic and dicarboxylic acids with the number of C atoms ranging from about 1 to about 4, e.g., formic and acetic acids, mixtures of aliphatic alcohols ($C_1$–$C_3$) with water, formamide, dimethylformamide and mixtures with water, aqueous solutions of mono- to trivalent metal perchlorates, nitrates, such as magnesium perchlorate, lithium nitrate, bromides such as and lithium bromide, calcium bromide, salts of organic acids with a salting-in effect, such as, sodium benzoate, tetramethyl ammonium decyl sulfonate, $C_{3-6}$ glycol ethers, their mixtures with $C_{3-6}$ alcohols and $C_{3-6}$ ketones, some heavy metal chlorides, such as zinc chloride, and the like. The diluent is generally employed in an amount of up to about 80% by weight, or up to its saturation point.

As employed above, the term "salting-in" means that the salt as added, increases the solubility or swelling-capacity of the gel. "Salting-out", on the other hand means, that the solubility is decreased by adding the respective salt.

The heating in an aqueous medium is carried out at a temperature of about 60° to 120°C, preferably about 70° to 100°C for about 0.5 to 70 hours. The temperature and the time can be also higher or lower. If one works for example, under pressure, the temperature may exceed 100°C and the time can be reduced to several minutes or even less. The time necessary, generally depends inversely upon the temperature.

Work under pressure is generally the only reason to increase the temperature above the boiling point of the mixture, thus the highest pressure is given by the highest temperature herein indicated (120°C). 5 atmospheres is generally the upper practical limit for carrying out the invention.

As the aqueous medium, there may be employed water, solutions of electrolytes having a pH of about 0.5 to 8, preferably about 0.5 to 2.5 and about 4.0 to 8. The range of electrolytes is practically infinite. The criterion employed is that the electrolyte be a chemically inert soluble acid, base, or salt, with the provision that their aqueous solutions have the aforementioned pH.

The invention also contemplates the addition of a small amount, such as 0 to 60%, preferably 3 to 40% of a further monomer, which monomer should be non-polar.

As non-polar ter-monomers there may be mentioned alkylesters of methacrylic and acrylic acids with alkyl chain lengths of 1–12 atoms, e.g. methyl acrylate or methacrylate, butyl methacrylate, octyl methacrylate, dodecyl acrylate and the like $C_{2-6}$ alkylvinyl ethers, e.g., butyl vinyl ether, styrene derivatives, such as methyl styrene, ethyl styrene and the like, $C_{1-12}$ vinyl esters, e.g. vinylacetate and others.

The copolymers per se are prepared by the usual method by a free radical copolymerization in the presence of known initiators which are effective at ambient or elevated temperature, and with the further addition of the aforementioned diluents, whose concentration and type control the properties of the gel as well as its transparency (homogeneity) and the miscibility (solubility) of the starting components. A crosslinking agent such as a divinyl compound, is further added to the polymerization mixture, e.g., methylenebisacrylamide or diesters of methacrylic acid and glycols in carrying out the instant invention. It is to be understood that the copolymerization reaction per se, forms a non-essential part of the invention, the invention broadly relates to the improvement in the copolymerization reaction which improvement relates to carrying out the process of the reaction in the presence of the crosslinking compound, a diluent and the like at the reaction parameters indicated hereinabove. With respect to the polymerization reaction per se, it is to be further understood that exemplary initiators for the free radical polymerization which can be used include diisopropyl peroxocarbonate, hydrogen peroxide or redox initiation systems, as for instance ammonium persulfate-potassium disulfite, sodium chlorate-sulfurous acid, or sodium formaldeyde sulfoxylate-hydrogen peroxide and the like.

As stated earlier, the weight ratio of monomers, e.g. 2-hydroxyethyl methacrylate: methacrylamide may be varied from 8 : 2 to 1 : 9. The upper limit of the diluent such as water, depends on the weight ratio of both monomers and is given by a limit of phase separation in the course of copolymerization and by formation of a non-homogeneous gel, while the lower limit is determined by the solubility of methacrylamide in the polymerization mixture at temperatures up to about 50°C.

Broadly speaking, in order to prepare transparent gels with higher concentrations of the diluent, mixtures of glycol to water (1 : 1) or acetic acid to water (1 : 1), anhydrous acetic acid, 1M solution of magnesium perchlorate, or other mediums producing a good swelling of the resulting copolymer are used as the diluent. The diluent is then extracted with water; in some cases the transparency is achieved more rapidly when the gels are dried in part, down to 30 – 40% of water and then re-swelled in water to equilibrium.

Generally speaking, the weight ratio of 2-hydroxyethyl methacrylate to amide will be about 8 : 2 to 1 : 9. Where a third monomer is employed, its amount will be about 3 – 40 % by wt. of the monomers, preferably 30% by weight.

For the purposes of illustration, only the reaction process will be described hereinafter with reference to one specific embodiment of the invention.

It has been found that the degree of equilibrium swelling of the polymer in water increases with rise of the concentration ratio of methacrylamide to 2-hydroxyethyl methacrylate and reaches its maximum at about 50 – 70% of methacrylamide, at which point the copolymer sorbs substantially double amounts of water in comparison with the gel formed only of 2-hydroxyethyl methacrylate units. The concentration of water as a diluent can be chosen in such a way that the equilibrium swelling in water corresponds to the amount of water in the polymerization mixture, so that the volume of the gel after polymerization does not change any more on contact with water (e.g. 60% of water for 30% of methacrylamide, 70% of water for 30% of methacrylamide, etc.). If a higher degree of dilution is required with the homogeneity (transparency) of the gel being preserved at the same time, another diluent may be chosen instead of water which diluent is a good swelling agent for the gel, exemplary are those earlier mentioned diluents, e.g. ethylene glycol or its mixtures with water, organic acids, such as formic or acetic acid and their mixtures with water, aqueous solutions of salts with a salting-in effect, e.g., perchlorates, metal nitrates or zinc chloride, salts of organic acids, sodium benzoate, and the like.

A higher concentration of methacrylamide modifies the selectivity of the gel to ions; if this affinity is characterized e.g. by salting-in and salting-out effects, then the higher content of methacrylamide suppresses e.g. the salting-in effect of perchlorates and with sodium thiocyanate the salting-in effect even changes into a salting-out, which is an exception from the rule observed with both synthetic and natural hydrophilic polymers. The degree of swelling exhibited is a minimum in this case. In contrast, the affinity of the gel to cations of multivalent and heavy metals increases. The properties of the gel can be further modified if desired, by combining the two monomers (methacrylamide and 2-hydroxyethyl methacrylate) with a non-polar monomer such as an alkyl acrylate, alkyl methacrylate, alkylvinylether, styrene, $C_{1-4}$ alkyl styrene derivative, etc., as above referred to. Also the combination of another polar monomer with a non-polar monomer can be used for the modification, as e.g. 2-hydroxyethoxyethyl methacrylate with octyl methacrylate. A diluent has to be chosen in this case, which provides miscibility of the monomers before polymerization and a homogeneous course of the polymerization, for instance, ethylene glycol or its mixtures with ethanol or diethylene glycol diethylether may be employed for this purpose. The required degree of swelling in water may be then adjusted by a proper combination of these monomers. The addition of monomers which are operative to form homopolymers with a high glass transition temperature, particularly increases the rigidity and strength of the gel, while monomers giving homopolymers having a low glass transition temperature favorably influence elongation at break of the gel.

Concering the influence of amide monomeric units upon mechanical properties, two factors become evident: raising of the degree of swelling and enhanced rigidity of the polymer. While the former factor prevails in the copolymers with acrylamide and mechanical properties deteriorate, both factors are compensated in the copolymers of methacrylamide, so that for example, tensile strength of the equilibrium swollen gel related to its dry cross section does not change with increasing concentration of methacrylamide units, even when the degree of swelling is raised up to several times. Comparing gels having an equal degree of swelling, increasing the content of methacrylamide units causes a distinct increase in strength, elongation at break and modulus.

As has been mentioned above, the swollen gels based on the copolymers of above referred to, e.g. methacrylamide (acrylamide) and hydroxyethyl methacrylate, have a special ability to change their structure by heat treatment in the sense of decreasing the degree of swelling and improvement of mechanical properties, e.g. modulus, strength and elongation at break. This treatment proceeds well in distilled water, but it has been found that best results are obtained by controlling the pH of the medium. A dependence of the relative degree of swelling in water (with respect to the degree of swelling of the untreated sample) found for buffer solutions and solutions of organic and inorganic acids shows that a remarkable change takes place in the neutral medium (pH 6 to 8) and in stronger acids, while weak acids (pH 2 to 5) change the properties of the gel substantially less. A heavy increase in the swelling, leading up to the loss of mechanical cohesion occurs in alkaline mediums. Temperatures of around 70°– 100°C are suitable from the viewpoint of velocity of the transformation; e.g. at 80°C the formation is completed to the extent of 85 to 90% after 12 hours. An interesting feature is, that neither homopolymers of the given components nor copolymers of similar composition exhibit the degree of the described change of properties by merely heating in water or neutral mediums; the homopolymers of 2-hydroxyethyl methacrylate do not change, while the homopolymers of methacrylamide or acrylamide increase gradually their degree of swelling many times or even completely dissolve. In an acidic medium, however, a decrease of swelling may be obtained with amide homopolymers. The transformation is generally catalyzed by acids and bases and its course is influenced by the presence of salts. Thus, the addition of sodium chloride to the water used as a medium for the heat treatment of the gel supports the transition of the gel in the sense of deswelling and/or increase of strength and elongation at break.

A comparative example of changes in the degree of swelling and mechanical properties of the heat-treated gels is given in Table 1.

TABLE 1

Effect of the heat treatment on properties of gels

| Copolymer composition | $w_o$% | Heating °C | medium | W | $\sigma_b$ (kg/cm$^2$) | $\epsilon_b$ % |
|---|---|---|---|---|---|---|
| 25%MAA, 75% HEMA | 60 | 90 | water | 1.43 (2.23) | 9.5 (2.1) | 910 (320) |
| 50%MAA, 50% HEMA | 65 | 90 | water | 1.43 (2.85) | 75.1 (0.9) | 215 (60) |
| 75%MAA, 25% HEMA | 65 | 90 | water | 1.65 (2.87) | 36.1 (1.0) | 410 (60) |
| 50%MAA, 50% HEMA | 65 | 90 | 2M NaCl | 1.15 (2.85) | | |
| 50% AA, 50% HEMA | 60 | 80 | 20% HCOOH | 5.00 (8.70) | | |

The values in parentheses characterize properties of the gel prior to the heat treatment. MAA - methacrylamide; AA - acrylamide; HEMA - 2-hydroxyethyl methacrylate; W - equilibrium degree of swelling (weight of the swollen gel) weight of the dry gel; $w_o$ - concentration of water in the polymerization; $\sigma_b$ - tensile strength of the equilibrium swollen sample in water related to a unit of the swollen cross section; $\epsilon_b$ - elongation at break of the swollen gel. The heating time was 36 hours.

The following examples are given to further illustrate the invention, they are not, however, to be considered as a limitation thereof. All parts, proportions and percentages therein as well as in the appended claims are by weight, unless otherwise indicated.

EXAMPLE 1

2-Hydroxyethyl methacrylate (5 g), methacrylamide (5 g) and methylenebisacrylamide (0.03 g) are dissolved in 6.6 g of water and 0.015 g of diisopropyl peroxocarbonate is added. The solution is bubbled through with nitrogen, charged into a flat mold between two glasses or Teflon plates and polymerized at 55°C for 5 hours. A clear gel membrane is formed.

EXAMPLE 2

Hydroxyethyl methacrylate (5 g), 15 g of 2-(2-hydroxyethyl)-ethyl methacrylate, 10 g of butyl acrylate and 10 g of methacrylamide are dissolved in 60 ml of ethylene glycol and polymerized at 60°C according to the procedure described in Example 1. A transparent gel is formed which maintains its transparency even after extraction of the diluent by water.

The ratio of the hydrophilic components (2-(2-hydroxyethoxy)ethyl methacrylate, methacrylamide) to the hydrophobic component may be varied in the region given by the miscibility of components in the original system and by homogeneity of the gel after polymerization. Other diluents can be used instead of ethylene glycol, as for example mixtures of ethylene glycol with ethanol or diethylene glycol dimethylether, etc. Butyl acrylate as termonomer, (non polar) may be replaced e.g. by methyl acrylate, methyl methacrylate, butyl methacrylate, octyl methacrylate, dodecyl acrylate or butylvinylether.

EXAMPLE 3

Strips made from the gel prepared according to Examples 1 and 2 are placed on a stainless steel plate, which is dipped in distilled water, and heated to 90°C for 12 hours. During this process, the partial de-swelling of the sample and an outstanding increase of its rigidity takes place.

This procedure serves for the treatment of gels based on copolymers of acrylamide and methacrylamide with 2-hydroxyethyl methacrylate and prepared according to methods described in Example 1 and 2, or also based on copolymers of acrylamide with 2-hydroxyethyl methacrylate (20 – 70% of acrylamide) prepared according to Example 1. Instead of distilled water, aqueous solutions of acids can be used as the diluent medium, e.g., the solution of formic or acetic acid, or sulphuric acid.

Buffer solutions e.g., solutions of partially neutralized acetic or phosphoric or citric acids or other partially neutralized weak acid or bases having pH in the desired range from 0.5 to 8.0 may be advantageously used, inasmuch as the change of properties of the gel strongly depends on the pH of the medium. Solutions of some inorganic salts which favorably influence the transformation are also preferred, e.g. sodium chloride solutions.

Ambient temperature is employed herein to mean about 18° to about 25°C.

Although the present invention has been described hereinabove with respect to certain specific embodiments, it is to be understood that obvious modifications may be made by those skilled in the art without departing from the intended scope of the invention.

I claim:

1. A process for producing transparent hydrophylic gels having improved mechanical and sorption properties made from copolymers of 2-hydroxyethyl methacrylate and amides of methacrylic or acrylic acid, comprising copolymerizing 2-hydroxyethyl methacrylate with about 20 to about 90 weight percent of methacrylamide or about 20 to about 80 weight percent of acrylamide in the presence of about 0.01 to 10% of a cross-linking agent selected from the group consisting of esters of methacrylic and acrylic acids with $C_{1-4}$ alkylene glycols; poly ($C_{1-4}$) alkylene glycols; polyols; glycerine; N,N'-alkylene-bis-acrylamides and methacrylamides; tri-acryloyl-triazine and divinyl sulphone and compatible mixtures thereof and up to about 80% of a diluent selected from the group consisting of glycols, polyglycols and aqeuous mixtures thereof; $C_{1-4}$ mono- and dicarboxylic acids; $C_{1-3}$ aliphatic alcohols and aqueous mixtures thereof; formamide, dimethylformamide and aqueous mixtures thereof; aqueous solutions of mono-di- and trivalent methal perchlorates; nitrates; bromides; organic acid salts; $C_{3-6}$ glycol ethers; $C_{3-6}$ alcohols; $C_{3-6}$ ketones; aromatic acids; and some heavy metal chlorides and subsequently heating of said gels in an aqueous medium having a pH of between 0.5 and 8.

2. A process as defined in claim 1 wherein said methacrylamide is present in amounts of about 25 to about 75% and said acrylamide is present in amounts of about 20 to 50% by weight.

3. A process as defined in claim 1 wherein the heating is carried out in an aqueous medium.

4. A process as defined in claim 3 wherein said aqueous medium is a solution of electrolytes having a pH of about 0.5 to about 8.0.

5. A process as defined in claim 1 further comprising adding a third monomer selected from the group consisting of non-polar vinyl and/or acrylic monomers.

6. A process as defined in claim 5 wherein said non-polar monomer is selected from the group consisting of styrene, $C_{1-4}$ alkyl substituted styrenes, $C_{1-12}$ alkyl esters of acrylic and methacrylic acid; $C_{2-6}$ alkyl vinyl ethers and $C_{1-12}$ vinyl esters.

7. A process as defined in claim 5 wherein said third monomer is included in amounts of about 3 to 40% by weight.

8. A process as defined in claim 3, wherein said heating is carried out at a temperature of about 60° to 120°C.

9. A process as defined in claim 1 wherein said diluent is water.

10. A process as defined in claim 1 wherein compounds which homogeneously dissolve all of the monomers and are miscible with water are used in the polymerization as diluent.

11. A transparent hydrophilic gel having improved mechanical and sorption properties produced by the process as defined in claim 1.

* * * * *